-2?-355 S?
3/31/87 X? Re 32,387

United States Patent [19]
Rogers

[11] E Patent Number: Re. 32,387
[45] Reissued Date of Patent: Mar. 31, 1987

[54] ATHLETIC SUPPORT FABRIC

[75] Inventor: Jack S. Rogers, Spartanburg, S.C.

[73] Assignee: Milliken Research Corporation, Spartanburg, S.C.

[21] Appl. No.: 638,240

[22] Filed: Aug. 6, 1984

Related U.S. Patent Documents

Reissue of:
[64] Patent No.: 4,435,467
Issued: Mar. 6, 1984
Appl. No.: 492,820
Filed: May 9, 1983

[51] Int. Cl.[4] ..... B32B 7/00
[52] U.S. Cl. ..... 428/254; 428/253; 428/257; 428/284; 428/287; 428/343; 428/354; 428/356; 66/195
[58] Field of Search ..... 428/253, 254, 257, 284, 428/287, 343, 354, 356; 66/195

[56] References Cited

U.S. PATENT DOCUMENTS

| | | | |
|---|---|---|---|
| 3,279,221 | 10/1966 | Gliksmann | 66/192 |
| 3,567,565 | 3/1971 | Jones et al. | 161/50 |
| 3,649,428 | 3/1972 | Hughes | 161/50 |
| 3,672,187 | 6/1972 | Simpson | 66/192 |
| 3,769,815 | 11/1973 | Ploch et al. | 66/85 A |
| 4,277,527 | 7/1981 | Duhl | 428/109 |
| 4,285,216 | 8/1981 | Duhl | 66/192 |
| 4,298,645 | 11/1981 | Obayashi et al. | 428/257 |
| 4,304,813 | 12/1981 | Flonore | 428/257 |
| 4,388,364 | 6/1983 | Sanders | 428/253 |

FOREIGN PATENT DOCUMENTS 68316 9/1969 German Democratic Rep. .

OTHER PUBLICATIONS

Bahlo, K. W., "New Fabrics Without Weaving", Modern Textiles Magazine, Nov. 1965, pp. 51-54.

*Primary Examiner*—James J. Bell
*Attorney, Agent, or Firm*—Earle R. Marden; H. William Petry

[57] ABSTRACT

An athletic support fabric having a knit synthetic substrate with an adhesive coated on the face thereof. The substrate has a weft yarn inserted on the face and a non-woven web on the rear thereof, each being held in place by a chain stitch knitted therethrough.

8 Claims, 7 Drawing Figures

ATHLETIC SUPPORT FABRIC

Matter enclosed in heavy brackets [ ] appears in the original patent but forms no part of this reissue specification; matter printed in italics indicates the additions made by reissue.

This invention relates generally to a coating substrate fabric for use in an article such as an athletic tape and in particular to a polyester filament fabric in which the interstices between the yarns therein are filled to provide supporting structure for an adhesive placed thereon.

Prior to this invention, it was difficult to provide a substrate fabric of low construction, i.e. few ends and picks, which would allow coating thereof without strike through of the adhesive material resulting in an uneven layer of adhesive material. This type of adhesive coated fabric is unacceptable for applications which require uniform adhesion and good tearability.

Therefore, it is an object of the invention to provide a unique substrate fabric which will provide uniform adhesion with little strike through when calendar coated.

Other objects and advantages of the invention will become readily apparent as the specification proceeds to describe the invention with reference to the accompanying drawings, in which.

Figure 1:
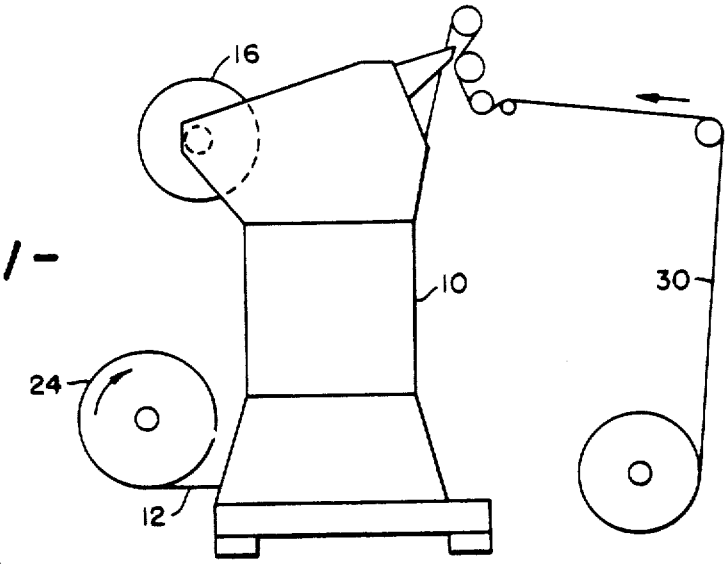
FIG. 1 is a side schematic view of the machine to produce the new substrate fabric.
Figure 2:
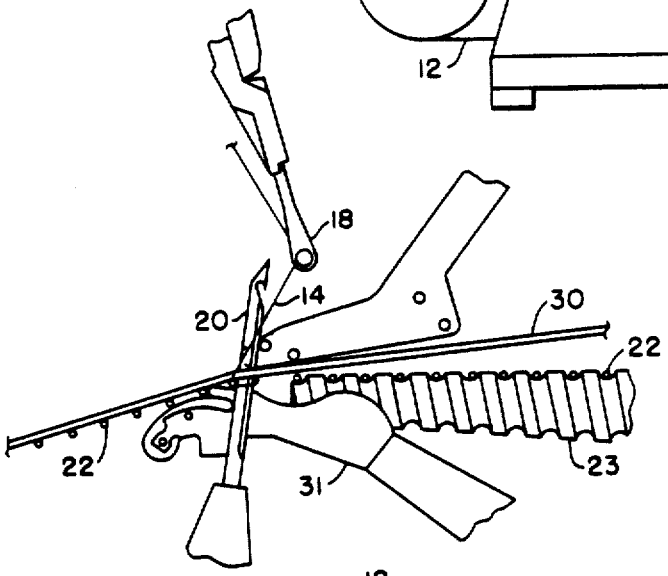
FIG. 2 is a blown up view of the operating mechanism of the knitting machine shown in FIG. 1.
Figure 3:
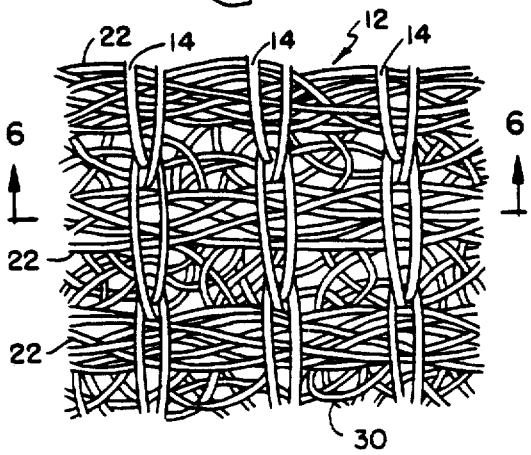
FIG. 3 is a technical face or top view of the substrate fabric produced on the machines of FIGS. 1 and 2.
Figure 4:
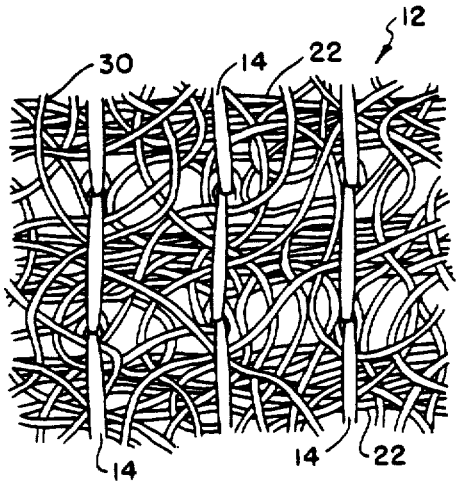
FIG. 4 is a technical rear or bottom view of the fabric shown in FIG. 3.
Figure 6:
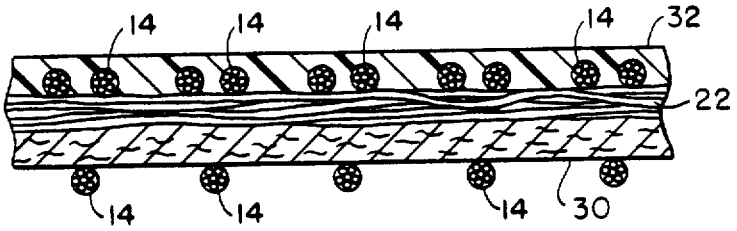
FIG. 6 is a cross-section taken on line 6—6 of FIG. 3 showing the top of the substrate coated with a desired adhesive.

FIGS. 1 and 2 schematically represent a warp knit, weft inserting knitting machine 10 which is employed to provide the substrate fabric 12 shown in FIGS. 3 and 4. To this end, the knitting yarn 10 supplied from the warp beam 16 through the guide bars 18 of the machine 12 to the needles 20 is a 40 denier, 34 filament DuPont type 56 polyester. The lay-in filling yarn 22 supplied from side mounted creels (not shown) to the rotating screw type member 23 is a 150 denier, 34 filament, DuPont type polyester yarn which extends across the wales of the fabric, Inserted over the fill lay-in yarn 22 is a polyester non-woven web sheet 30 of 15–18 grams/square yard. As shown in FIG. 2, the polyester or rayon non-woven web 30 is supplied over the fill yarns 22 as the needles 20, guide bars 18 and sinker 31 co-act in conventional manner to knit the yarn 14 in a chain stitch to lock in the lay-in fill yarns 22 on the face or top side of the substrate with the non-woven web 30 being located thereunder and taken up on roll 24. As shown in FIGS. 3, 4 and 6, the knit yarn 14 secures the fill yarn 22 in position to stitch through and lock the non-woven web material 30 in a fixed position in the substrate.

As discussed briefly before, the non-woven web 30 allows the even distribution of a coating of a natural rubber latex compound adhesive for the purpose of making an adhesively coated athletic support tape fabric. The disclosed substrate fabric is particularly adapted for the production of an athletic tape fabric since the coating bridges the interstices between the knit warp yarns and the layed in fill yarns thereby providing even distribution without strike through of the adhesive coating material resulting in uniform adhesion of the adhesive material during calendar coating.

Figure 5:
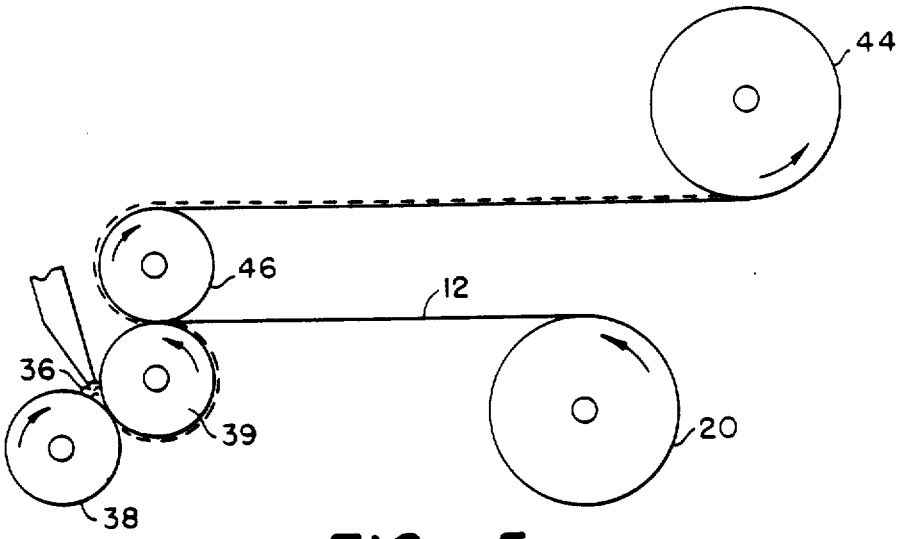
FIG. 5 is a schematic adhesive coating range for the novel substrate fabric.

The adhesive coating 32 can be applied in any suitable manner as illustrated in FIG. 5 wherein the adhesive material 36 is calendar coated by calendar rolls 38 and 39 onto the face of the substrate 12 delivered from the roll 24. From the calendar rolls 38 and 39 the coated fabric will normally be delivered to the take-up roll 44 by roll 46. FIG. 5 illustrates a single pass unit to obtain an adhesive coating on the top of the substrate so that the adhesive coating will be located facing towards the interior of the roll to provide a non-sticky exterior. FIG. 5 is only illustrative since other coating systems such as (1) a doctor blade, or (2) knife over roll can be employed, if desired.

It can be seen that a substrate has been provided that has strength due to its construction, but also provides a structure which tends to alleviate strike through problems when the fabric is coated with an adhesive material. Also the use of polyester filament yarn allows the manufacture of a substrate which is strong and which can be produced at lower raw material cost resulting in cost savings to the coater as well as the ultimate customer of the coated material.

Figure 7:
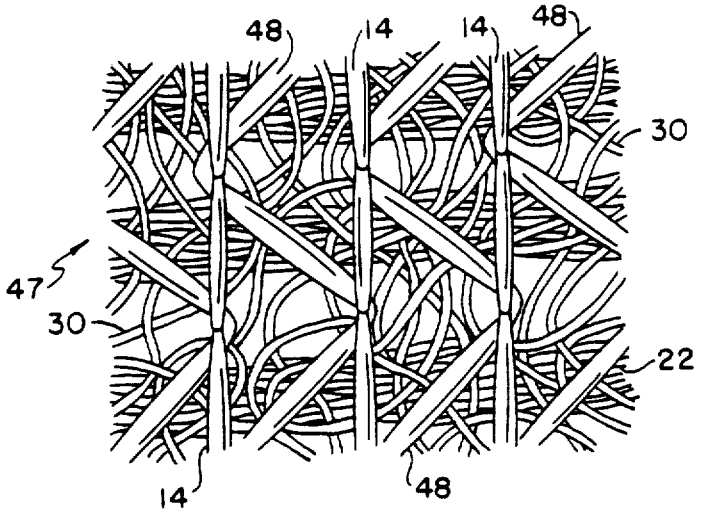
FIG. 7 is a modification of the substrate shown in FIG. 4.

FIG. 7 is a rear view of a modified substrate material 47 in that a 40 denier, polyester warp yarn 48 is laid in using a 0-0/2-2 stitch to help prevent the transfer of the non-woven web material 30 to the adhesive of the tape after the tape is rolled up in completed form.

The invention provides an economical warp knitted, weft insertion fabric stitched through a light weight (15–18 gm/sq. yd.) non-woven web. The web provides the cover needed to prevent strike through of the adhesive during calendar coating. The warp stitching yarn adds strength to the web to allow for coating and strength for the end use as a compressive adhesive coated athletic tape. The filling yarn acts to receive the adhesive coating and, after coating, prevents slippage of the looped warp yarn laterally when the tape is torn. This prevents bunching of the warp yarns and make the tearing properties desirable. This stitch through weft insertion warp knit fabric must be coated on the side with the filling yarn on the surface to obtain adequate tearability. The warp yarn is stitched with an open chain stitch 12 courses/inch. Use of this polyester knit/-stitching yarn gives good conformability to an irregular surface because of the elongation of the filament yarn and its spacing (18/inch) versus the low elongation of cotton spun yarns used in the high pick sheeting.

Although the preferred embodiments have been described in detail, it is contemplated that many changes may be made without departing from the scope or spirit of the invention and therefore, I desire to be limited only by the claims.

I claim:

1. An athletic support fabric having a substrate comprising: a warp knit fabric having a face and a rear side, a plurality of rows of weft continuous filament weft yarn laid in on the face side of said knit fabric, a layer of non-woven fabric on the rear side of side of said knit fabric, a plurality of wales of a chain stitch spaced along the course direction of said fabric being knit through said non-woven fabric and holding said non-woven fabric and said weft yarn in position and a layer of rubber base adhesive coated to the face side of said fabric.

2. The fabric of claim 1 wherein said substrate is all synthetic yarn.

3. The fabric of claim 2 wherein said synthetic yarn is polyester.

4. The fabric of claim 1 wherein an additional warp yarn is laid in the wale direction of the rear side of said substrate fabric.

5. The fabric of claim 4 wherein said additional warp yarn is polyester.

6. The fabric of claim 4 wherein said additional warp is laid in a 0-0/2-2 stich.

7. The fabric of claim 6 wherein all of the yarns in said substrate fabric are synthetic.

8. The fabric of claim 7 wherein all of said yarns are polyester.

* * * * *